United States Patent
Muppala

(10) Patent No.: US 7,554,983 B1
(45) Date of Patent: Jun. 30, 2009

(54) PROBING HOSTS AGAINST NETWORK APPLICATION PROFILES TO FACILITATE CLASSIFICATION OF NETWORK TRAFFIC

(75) Inventor: Suresh Muppala, Cupertino, CA (US)

(73) Assignee: Packeteer, Inc., Cupertino, CA (US)

( * ) Notice: Subject to any disclaimer, the term of this patent is extended or adjusted under 35 U.S.C. 154(b) by 684 days.

(21) Appl. No.: 11/019,501

(22) Filed: Dec. 20, 2004

(51) Int. Cl.
H04L 12/28 (2006.01)
H04L 12/56 (2006.01)

(52) U.S. Cl. .................... 370/392; 370/410
(58) Field of Classification Search ................ 370/392, 370/410
See application file for complete search history.

(56) References Cited

U.S. PATENT DOCUMENTS

| | | | |
|---|---|---|---|
| 6,363,056 B1 * | 3/2002 | Beigi et al. ............ 370/252 |
| 6,628,938 B1 * | 9/2003 | Rachabathuni et al. ... 455/456.3 |
| 6,690,918 B2 * | 2/2004 | Evans et al. ............. 455/41.2 |
| 7,154,416 B1 * | 12/2006 | Savage .................... 341/51 |
| 7,155,502 B1 * | 12/2006 | Galloway et al. ......... 709/223 |
| 7,224,679 B2 * | 5/2007 | Solomon et al. .......... 370/338 |
| 7,292,531 B1 * | 11/2007 | Hill ....................... 370/230.1 |
| 7,296,288 B1 * | 11/2007 | Hill et al. ................. 726/2 |
| 7,324,447 B1 * | 1/2008 | Morford .................. 370/231 |
| 2003/0185210 A1 * | 10/2003 | McCormack ............ 370/392 |

* cited by examiner

Primary Examiner—Edan Orgad
Assistant Examiner—Blanche Wong
(74) Attorney, Agent, or Firm—Baker Botts L.L.P.

(57) ABSTRACT

Methods, apparatuses and systems directed to a network traffic classification mechanism that probes hosts against one or more network application profiles to facilitate identification of network applications corresponding to data flows traversing a network.

23 Claims, 10 Drawing Sheets

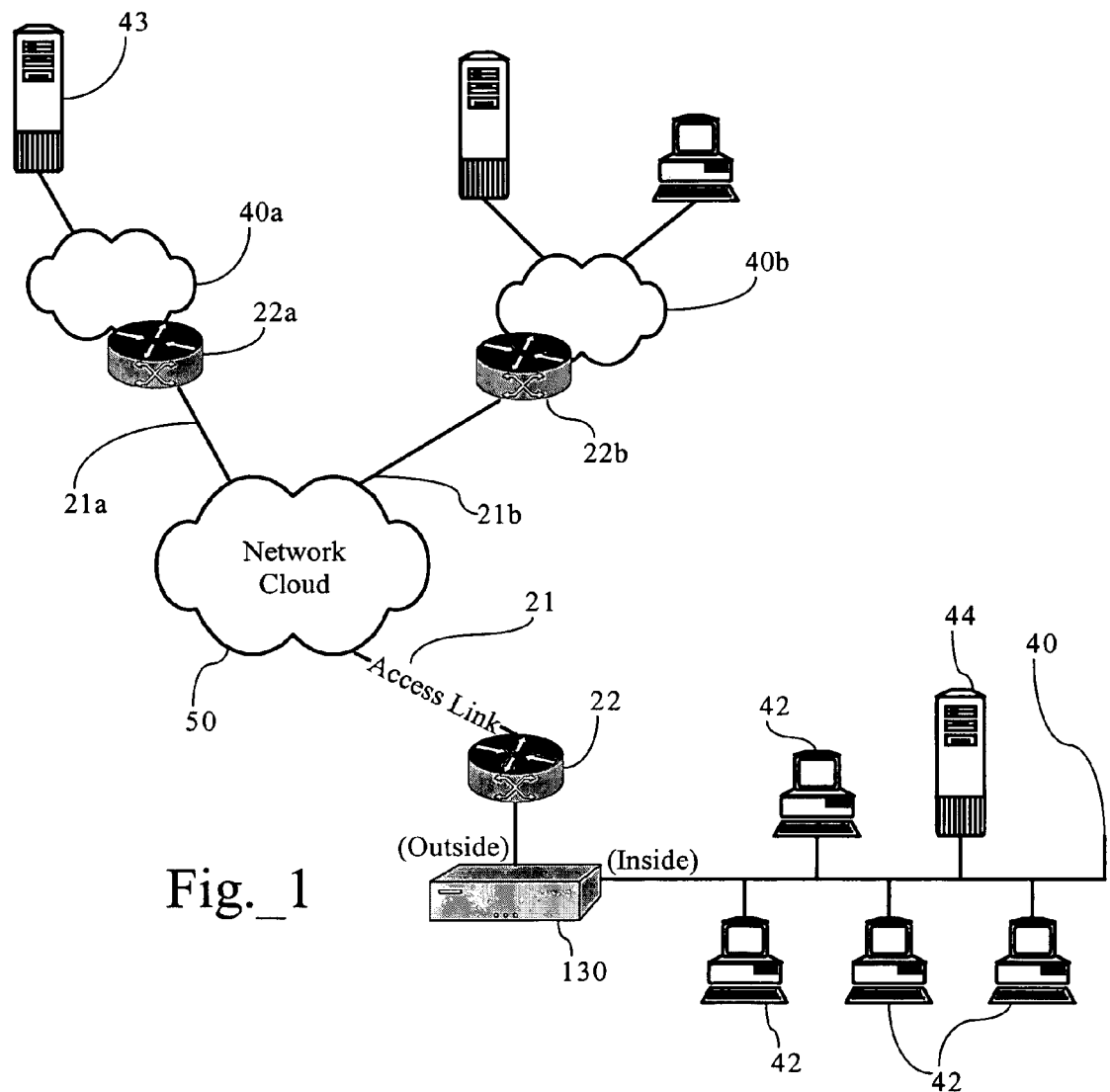
Fig._1

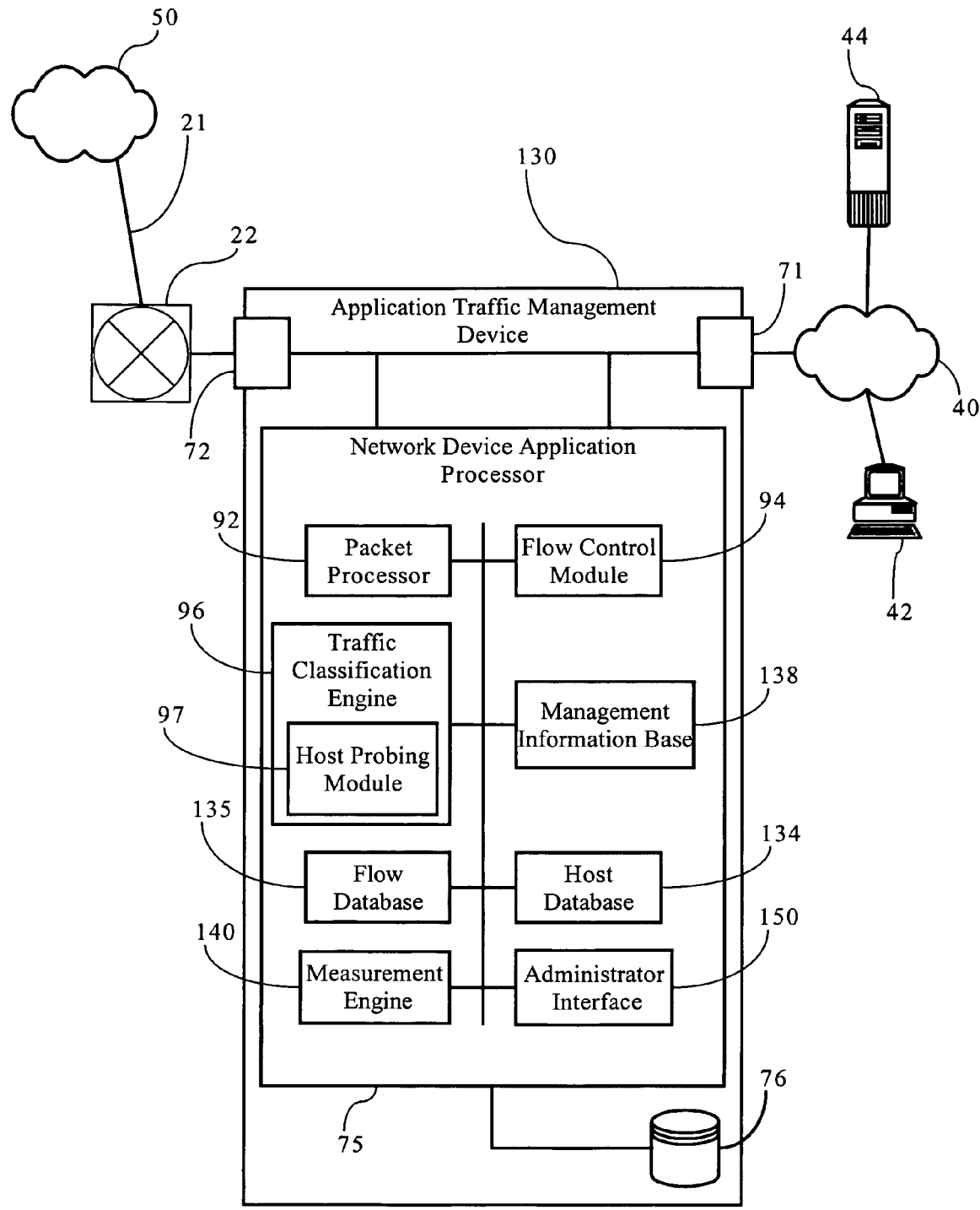
Fig._2

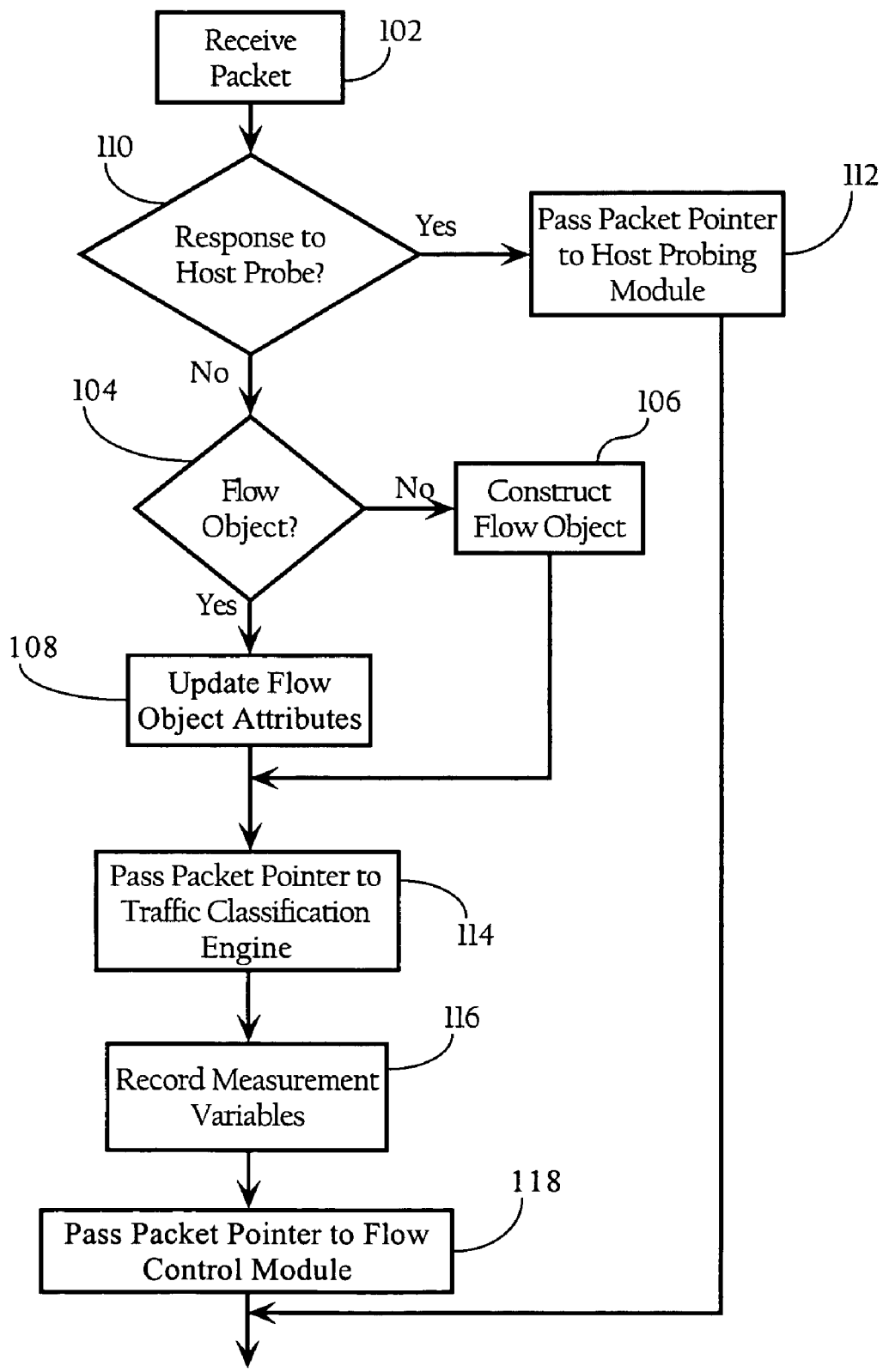
Fig._3

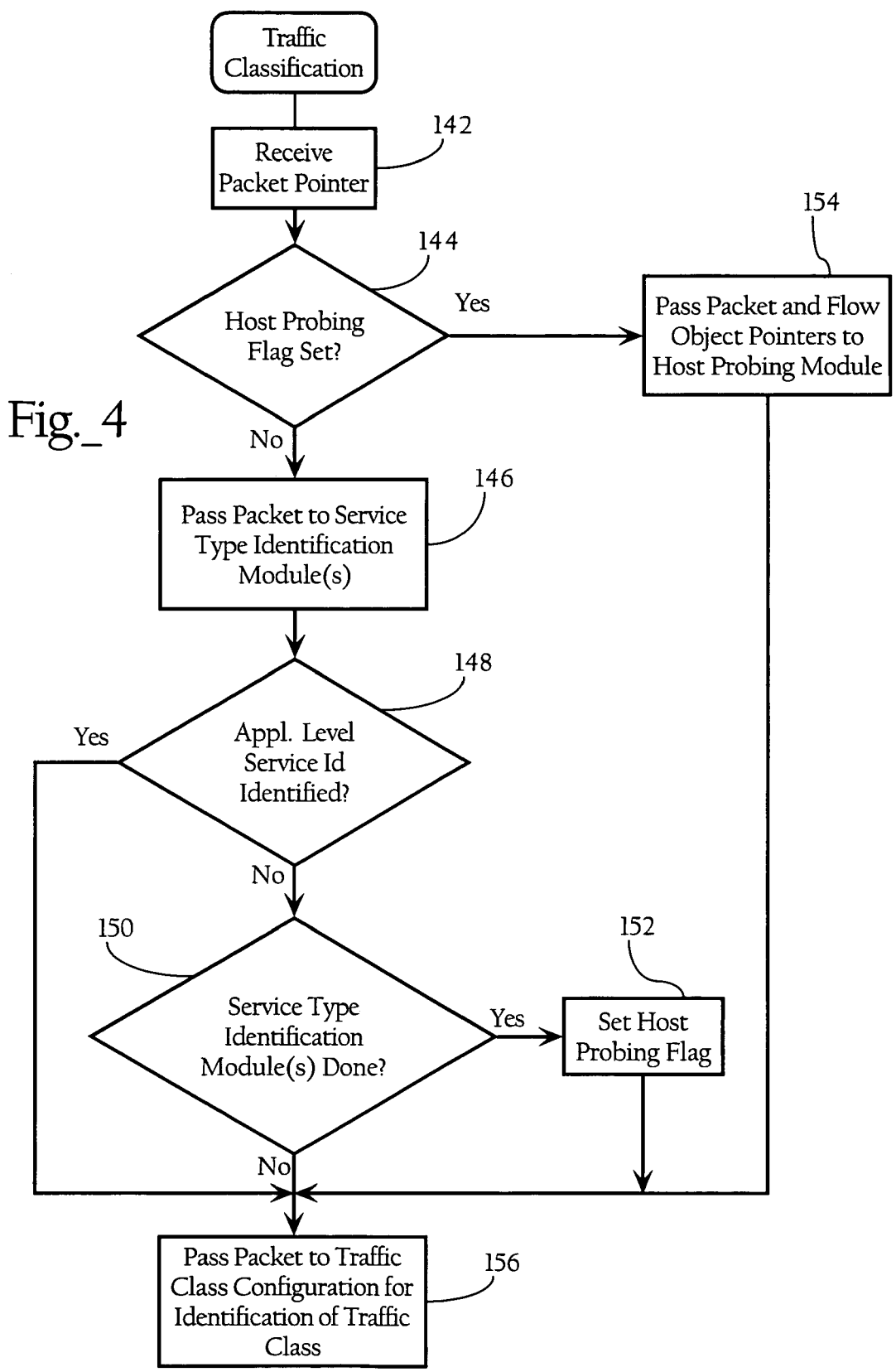

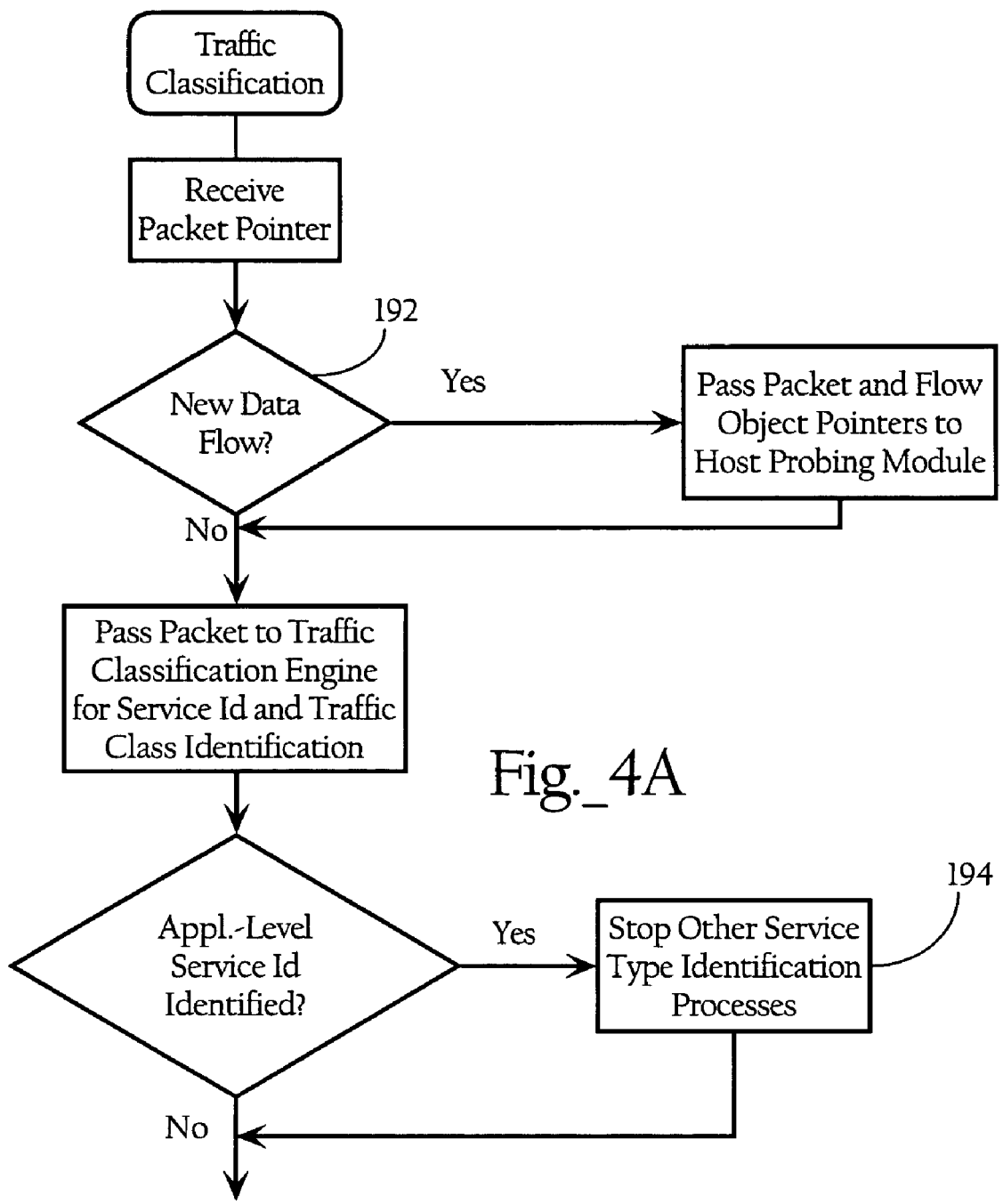
Fig._4A

```
P1 -- Probe Packet

Packet Info
    Flags:                 0x00
    Status:                0x01
    Packet Length:         170
    Timestamp:             13:47:09.797938000 08/11/2004
Ethernet Header
    Destination:           00:0C:41:8A:1C:10
    Source:                00:04:23:64:2C:A4
    Protocol Type:         0x0800  IP
IP Header - Internet Protocol Datagram
    Version:               4
    Header Length:         5   (20 bytes)
    Differentiated Services:%00000000
                           0000 00.. Default
                           .... ..x. Reserved
                           .... ...x Reserved Total Length:          152
    Identifier:            13198
    Fragmentation Flags:   %000
                           0.. Reserved
                           .0. May Fragment
                           ..0 Last Fragment
    Fragment Offset:       0   (0 bytes)
    Time To Live:          128
    Protocol:              17  UDP
    Header Checksum:       0x6D3E
    Source IP Address:     192.168.1.101
    Dest. IP Address:      132.205.82.174
UDP - User Datagram Protocol
    Source Port:           41431
    Destination Port:      19653
    Length:                132
    UDP Checksum:          0xA727
Application Layer
    Data Area:
    *..Vy5.......E.   5C CF 02 E5 A8 F5 8D 25 AB 5F 49 2C 14 C5 9B 54
    ..;..,..F...B.    73 B5 25 5E 9D 2E 6B 2F A0 3A C6 00 58 B2 C2 47
    .....R..........  2A 38 EA B1 AA D9 3E 42 4F 23 DA 17 2B 2B AF 8B
    ........#.k.j..   BC 0F 36 25 9F AE AE 38 7B 3B 92 46 FD 91 8F 03
    ..o.V?...n.%..    AF 4B 96 9A 06 E5 6F 3E FB B9 5F 95 9F 6C 2A 8B
    o.T.8o..K...J     96 23 74 E3 DE F8 66 96 1A 33 D2 CE 05 B9 D1 FC
    ..j......Z......  FF 25 91 8A AB 38 33 05 3B E9 8D 07 BE 37 8E BF
    o..ccb....Gu      96 BA 4F 83 83 82 B7 56 32 1F C7 A4
FCS - Frame Check Sequence
    FCS:                   0xB155480A  Calculated
```

Fig._6A

P2 - Response (Type: Fixed Data)

Packet Info
    Flags:                0x00
    Status:             0x00
    Packet Length:     64
    Timestamp:        13:47:09.915190000 08/11/2004
Ethernet Header
    Destination:       00:04:23:64:2C:A4
    Source:             00:0C:41:8A:1C:10
    Protocol Type:     0x0800  *IP*
IP Header - Internet Protocol Datagram
    Version:           4
    Header Length:     5  *(20 bytes)*
    Differentiated Services:%00000000
                                 0000 00.. *Default*
                                 .... ..x. *Reserved*
                                 .... ...x *Reserved*

Total Length:      39
    Identifier:        30735
    Fragmentation Flags: %000
                                 0.. *Reserved*
                               .0. *May Fragment*
                               ..0 *Last Fragment*

Fragment Offset:   0  *(0 bytes)*
    Time To Live:      106
    Protocol:          17  *UDP*
    Header Checksum:   0x3F2E
    Source IP Address: 132.205.82.174
    Dest. IP Address:  192.168.1.101
UDP - User Datagram Protocol
    Source Port:       19653
    Destination Port:  41431
    Length:              19
    UDP Checksum:  206  0xD966
Application Layer
    Data Area:
    *........         (5C CF)07 43 AA EB A0 33 13 09 DC
Extra bytes
    Number of bytes:
    ........            00 00 00 00 00 00 00
FCS - Frame Check Sequence
    FCS:                0xE8991AD0  *Calculated*

Fig._6B

P11 -- Probe Packet

```
Packet Info
    Flags:                  0x00
    Status:                 0x00
    Packet Length:          170
    Timestamp:              13:56:47.072424000 08/11/2004
Ethernet Header
    Destination:            00:0C:41:8A:1C:10
    Source:                 00:04:23:64:2C:A4
    Protocol Type:          0x0800  IP
IP Header - Internet Protocol Datagram
    Version:                4
    Header Length:          5  (20 bytes)
    Differentiated Services:%00000000
                            0000 00.. Default
                            .... ..x. Reserved
                            .... ...x Reserved Total Length:           152
    Identifier:             13198
    Fragmentation Flags:    %000
                            0.. Reserved
                            .0. May Fragment
                            ..0 Last Fragment Fragment Offset:        0  (0 bytes)
    Time To Live:           128            209
    Protocol:               17  UDP
    Header Checksum:        0x82AD
    Source IP Address:      192.168.1.101
    Dest. IP Address:       192.168.1.100
UDP - User Datagram Protocol
    Source Port:            41431
    Destination Port:       65020
    Length:                 132
    UDP Checksum:     206   0x0B5F
Application Layer
    Data Area:
    *..Vy5.......E.   5C CF 02 E5 A8 F5 8D 25 AB 5F 49 2C 14 C5 9B 54
    ..;..,..F...B.    73 B5 25 5E 9D 2E 6B 2F A0 3A C6 00 58 B2 C2 47
    .....R..........  2A 38 EA B1 AA D9 3E 42 4F 23 DA 17 2B 2B AF 8B
    ........#.k.j..   BC 0F 36 25 9F AE AE 38 7B 3B 92 46 FD 91 8F 03
    ..o.V?...n.%..    AF 4B 96 9A 06 E5 6F 3E FB B9 5F 95 9F 6C 2A 8B
    o.T.8o..K...J     96 23 74 E3 DE F8 66 96 1A 33 D2 CE 05 B9 D1 FC
    ..j......Z......  FF 25 91 8A AB 38 33 05 3B E9 8D 07 BE 37 8E BF
    o..ccb....Gu      96 BA 4F 83 83 82 B7 56 32 1F C7 A4
FCS - Frame Check Sequence
    FCS:                    0x2A289748  Calculated
```

Fig. _6C

P12 - Response (Type: Response with SrcIP)

```
Packet Info
    Flags:                    0x00
    Status:                   0x00
    Packet Length:            64
    Timestamp:                13:56:47.080097000 08/11/2004
Ethernet Header
    Destination:              00:04:23:64:2C:A4
    Source:                   00:C0:F0:7A:3D:AE
    Protocol Type:            0x0800  IP
IP Header - Internet Protocol Datagram
    Version:                  4
    Header Length:            5   (20 bytes)
    Differentiated Services:%00000000
                              0000 00.. Default
                              .... ..x. Reserved
                              .... ...x Reserved Total Length:             39
    Identifier:               64139
    Fragmentation Flags:      %000
                              0.. Reserved
                              .0. May Fragment
                              ..0 Last Fragment Fragment Offset:          0   (0 bytes)
    Time To Live:             128
    Protocol:                 17  UDP
    Header Checksum:          0xBC20
    Source IP Address:        192.168.1.100
    Dest. IP Address:         192.168.1.101
UDP - User Datagram Protocol
    Source Port:              65020
    Destination Port:         41431
    Length:                   19
    UDP Checksum:             0x4DFB
Application Layer
    Data Area:
        *...y.h2D.            5C CF 07 C0 A8 01 65 88 F2 C4 29
Extra bytes
    Number of bytes:
        .(....                00 59 4D 53 47 00 0C
FCS - Frame Check Sequence
    FCS:                      0x90403E32  Calculated
```

Fig._6D

PROBING HOSTS AGAINST NETWORK APPLICATION PROFILES TO FACILITATE CLASSIFICATION OF NETWORK TRAFFIC

CROSS-REFERENCE TO RELATED APPLICATIONS AND PATENTS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;" and U.S. patent application Ser. No. 10/938,435 in the name of Guy Riddle, entitled "Classification and Management of Network Traffic Based on Attributes Orthogonal to Explicit Packet Attributes."

FIELD OF THE INVENTION

The present invention relates to computer networks and, more particularly, to methods, apparatuses and systems directed to a network traffic classification mechanism that probes hosts against network application profiles to facilitate identification of network applications.

BACKGROUND OF THE INVENTION

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks.

To facilitate monitoring, management and control of network environments, a variety of network devices, applications, technologies and services have been developed. For example, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to provide a minimum bandwidth guarantee, and/or cap bandwidth, as to a particular class of traffic. An administrator specifies a traffic class (such as FTP data, or data flows involving a specific user or network application) and the size of the reserved virtual link—i.e., minimum guaranteed bandwidth and/or maximum bandwidth. Such partitions can be applied on a per-application basis (protecting and/or capping bandwidth for all traffic associated with a network application) or a per-user basis (controlling, prioritizing, protecting and/or capping bandwidth for a particular user). In addition, certain bandwidth management devices allow administrators to define a partition hierarchy by configuring one or more partitions dividing the access link and further dividing the parent partitions into one or more child partitions.

Furthermore, network security is another concern, such as the detection of computer viruses, as well as prevention of Denial-of-Service (DoS) attacks on, or unauthorized access to, enterprise networks. Accordingly, firewalls and other network devices are deployed at the edge of such networks to filter packets and perform various operations in response to a security threat. In addition, packet capture and other network data gathering devices are often deployed at the edge of, as well as at other strategic points in, a network to allow network administrators to monitor network conditions, to evaluate network performance, and to diagnose problems.

Many of the systems and technologies discussed above incorporate or utilize traffic classification mechanisms to perform their respective functions. Identification of traffic types associated with data flows traversing a network generally involves the application of matching criteria or rules to explicitly presented or readily discoverable attributes of individual packets, or groups of packets, against an application signature which may comprise a protocol identifier (e.g., TCP, HTTP, UDP, MIME types, etc.), a port number, and even an application-specific string of text in the payload of a packet. Indeed, the rich Layer 7 classification functionality of Packetshaper® bandwidth management devices offered by Packeteer®, Inc. of Cupertino, Calif. is an attractive feature for network administrators, as it allows for accurate identification of a variety of application types and, thus, granular monitoring and control of network traffic.

An increasing number of network applications, however, employ data compression, encryption technology, and/or proprietary protocols that obscure or prevent identification of various application-specific attributes, often leaving well-known port numbers as the only basis for classification. In fact, as networked applications become increasingly complex, data encryption and/or compression has become a touted security or optimization feature. Indeed, data encryption addresses the concern of security and privacy issues, but it also makes it much more difficult for intermediate network devices, such as network monitors and bandwidth managers, to identify the applications that employ them. In addition, traffic classification based solely on well-known port numbers can be problematic, especially where a network application uses dynamic port number assignments or incorrectly uses a well-known port number, leading to misclassification of the data flows. In addition, classifying such encrypted network traffic as unknown (or encrypted) and applying a particular rate or admission policy to unknown traffic classes undermines the granular control otherwise provided by bandwidth management devices and, further, may cause legitimate, encrypted traffic to suffer as a result.

Furthermore, the increasing adoption of standardized communications protocols also presents challenges to network traffic classification mechanisms. The increasing use of Web services networking protocols, for instance, makes granular classification of network traffic more difficult, since the data flows corresponding to a variety of different web services applications all use the same standard web services and other network protocols, such as HTTP, SMTP, NNTP, SOAP, XML and the like. For example, a Web service typically allows a consuming application to access the service using one to a plurality of different bindings based on standard network protocols, such as HTTP and SMTP. Accordingly, the packet headers in the messages transmitted to the web service, as well as the packet headers associated with any response, across a wide variety of web services will typically include less meaningful information in the lower layers of the headers associated with the network communication protocol stack. For example, as discussed above, a well-formed SOAP message using an HTTP binding will typically identify port number 80, the well-known port number for HTTP traffic. As a result of this standardization, it will become increasingly difficult to ensure that critical network services are protected and rogue services, which also employ Web service networking protocols, are restricted as the differentiation between services and applications moves up the network communications protocol stack. Moreover, as the information that distinguishes one Web service from another moves up the protocol stack, it becomes more difficult to configure the matching attributes required to classify each Web service.

Traffic classification mechanisms have to adapt to address these circumstances. For example, U.S. application Ser. No. 10/938,435 discloses network traffic classification mechanisms that classify network traffic based on the behavioral attributes of the data flows. U.S. application Ser. No. 10/720, 329 discloses the classification of data flows based on heuristic behavior pattern matching. These classification mechanisms differ from traditional classification mechanisms which classify traffic based on explicitly presented attributes of individual data packets.

In light of the foregoing, a need in the art exists for methods, apparatuses and systems that facilitate the classification of network traffic. Embodiments of the present invention substantially fulfill this need.

SUMMARY OF THE INVENTION

The present invention provides methods, apparatuses and systems directed to a network traffic classification mechanism that probes hosts against one or more network application profiles to facilitate identification of network applications corresponding to data flows traversing a network. Probing hosts against one or more network application profiles is useful to classify network traffic in many instances where explicitly presented attributes of the packets are obscured or insufficient to identify a network application, such as 1) in the case of encrypted network traffic, 2) where the network application does not have a known or unique application signature revealed in the packets, 3) where the packets are transmitted from a proprietary application where the header format is unknown, and 4) a large amount of memory would be otherwise required to store information from previous packets in a given flow for subsequent classification. Host probing can be executed concurrently with other traffic classification operations, or when other traffic classification operations have failed to identify a network application.

DESCRIPTION OF THE DRAWINGS

FIG. 1 is a functional block diagram illustrating a computer network system architecture in which an embodiment of the present invention may operate.

FIG. 2 is a functional block diagram illustrating the functionality of a network device, according to one implementation of the present invention, including host probing functionality.

FIG. 3 is a flow chart diagram showing a method, according to one implementation of the present invention, directed to processing and classifying data flows.

FIG. 4 is a flow chart diagram illustrating operation of a network traffic classification engine, according to one implementation of the present invention.

FIG. 4A is a flow chart diagram illustrating operation of a network traffic classification engine, according to another implementation of the present invention.

FIGS. 6A thru 6D illustrate the attributes of probe packets and responses, according to an implementation of the present invention.

DESCRIPTION OF PREFERRED EMBODIMENT(S)

Figure 5:
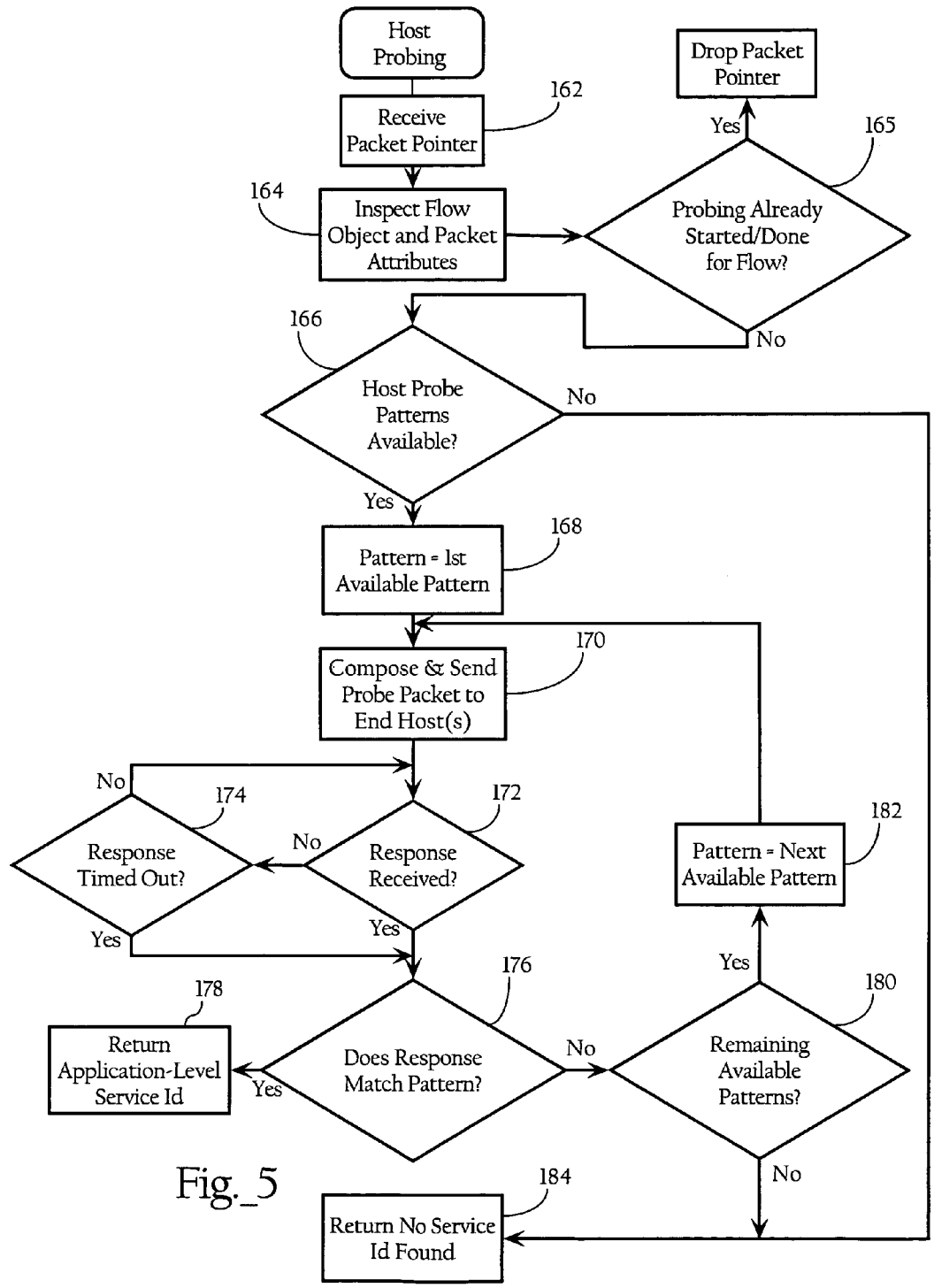
FIG. 5 is a flow chart diagram showing operation of a host probing module according to one implementation of the present invention.

FIGS. 1 and 2 illustrate an exemplary network environment in which an embodiment of the present invention operates. Of course, the present invention can be applied to a variety of network architectures. FIG. 1 illustrates, for didactic purposes, a network 50, such as wide area network, interconnecting a first enterprise network 40, supporting a central operating or headquarters facility, and a second enterprise network 40a, supporting a branch office facility. Network 50 may also be operably connected to other networks, such as network 40b, associated with the same administrative domain as networks 40, 40a, or a different administrative domain. As FIG. 2 shows, the first network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and network 50 is a packet-based communications environment, employing TCP/IP protocols, and/or other suitable protocols, and has a plurality of interconnected digital packet transmission stations or routing nodes. First network 40, and networks 40a it 40b, can each be a local area network, a wide area network, or any other suitable network.

As FIGS. 1 and 2 illustrate, application traffic management device 130, in one implementation, is deployed at the edge of network 40. In one implementation, application traffic management device 130 is operative to classify and manage data flows traversing access link 21. However, the traffic classification functionality according to the present invention can be integrated into a variety of network devices, such as proxies, firewalls, packet capture or network monitoring equipment, VPN servers, web services network gateways or brokers, and the like.

As FIG. 2 illustrates, network application traffic management device 130, in one implementation, comprises network device application processor 75, and first and second network interfaces 71, 72, which operably connect application traffic management device 130 to the communications path between router 22 and network 40. Network device application processor 75 generally refers to the functionality implemented by application traffic management device 130, such as network monitoring or reporting, application traffic management, and the like. In one embodiment, network device application processor 75 is a combination of hardware and software, such as a central processing unit, memory, a system bus, an operating system, device drivers, and one or more software modules implementing the functions performed by application traffic management device 130, as well as the coordinated traffic classification functionality described herein. For didactic purposes, application traffic management device 130 is configured to manage network traffic traversing access link 21. The above-identified patents and patent applications, incorporated by reference herein, disclose various functionalities and features that may be incorporated into application traffic management devices according to various implementations of the present invention.

In one embodiment, first and second network interfaces 71, 72 are the hardware communications interfaces that receive and transmit packets over the computer network environment. In one implementation, first and second network interfaces 71, 72 reside on separate network interface cards operably connected to the system bus of application traffic management device 130. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, application traffic management device 130, in one embodiment, includes persistent memory 76, such as a hard disk drive or other suitable memory device, such writable CD, DVD, or tape drives. In other implementations, application traffic management device 130 can include additional network interfaces, beyond network interfaces 71 and 72, to support additional access links or other functionality. Furthermore, U.S. application Ser. No. 10/843,185 provides a description of the operation of various modules, such as network interface drivers, and data structures for receiving into memory and processing packets encountered at network interfaces 71, 72.

As FIG. 2 illustrates, network device application processor 75, in one implementation, includes a packet processor 92, flow control module 94, and traffic classification engine 96. Network device application processor 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the Like) and storing packet attributes in a buffer structure, and maintaining one or more flow variables or statistics (such as packet count) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of application traffic management device 130, as well as manually created traffic classes configured by a network administrator, in a hierarchical traffic class structure. In one embodiment, traffic classification engine 96 stores traffic classes, in association with pointers to traffic management policies or pointers to data structures defining such traffic management policies. Traffic classification engine 96, in one implementation, is supported by a plurality of service type identification modules that classify network traffic into a variety of protocols, services and network applications, as discussed more fully below. As FIG. 2 further illustrates, traffic classification engine 96 comprises host probing module 97 which is operative to probe end hosts corresponding to data flows and classify the data flows based on the observed responses of the probed end hosts. In one implementation, flow control module 94 is operative to apply bandwidth utilization controls to data flows traversing the access link 21 in the inbound and/or outbound directions.

As discussed above, in one implementation, network device application processor 75 further comprises measurement engine 140, management information base (MIB) 138, and administrator interface 150. Management information base 138 is a database of standard and extended network objects related to the operation of application traffic management device 130. Measurement engine 140 maintains measurement and statistical data relating to operation of application traffic management device 130 to allow for monitoring of bandwidth utilization and network performance across access link 21 with respect to a plurality of bandwidth utilization and other network statistics on an aggregate and/or per-traffic-class level.

Administrator interface 150 facilitates the configuration of application traffic management device 130 to adjust or change operational and configuration parameters associated with the device. For example, administrator interface 150 allows administrators to select identified traffic classes and associate them with traffic management policies. Administrator interface 150 also displays various views associated with a hierarchical traffic classification scheme and allows administrators to configure or revise the hierarchical traffic classification scheme. Administrator interface 150 can provide a command line interface and/or a graphical user interface accessible, for example, through a conventional browser on client device 42.

A.1. Packet Processing

As discussed above, packet processor 92, in one implementation, is operative to detect new data flows, instantiate data structures associated with the flows and parse packets to identify packet attributes, such as source and destination addresses, port numbers, etc., and populate one or more fields in the data structures. In one embodiment, when packet processor 92 encounters a new data flow it stores the source and destination IP addresses contained in the packet headers in host database 134. Packet processor 92 further constructs a control block (flow) object in flow database 135 including attributes characterizing a specific flow between two end systems, such as source and destination port numbers, etc. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing application traffic management device 130. In one embodiment, the packets are stored in the packet buffer with a wrapper including various information fields, such as the time the packet was received, the packet flow direction (inbound or outbound), and a pointer to the flow object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block (flow) object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. Nos. 6,046, 980 and U.S. Pat. No. 6,591,299, as well as others incorporated by reference herein, disclose classification of data flows for use in a packet-based communications environment. FIGS. 1 and 2 illustrate the concept associated with inside and outside addresses, where network interface 71 is the "inside" network interface and network interface 72 is the "outside" network interface. As discussed above, in one embodiment, a flow specification object includes an "inside" and "outside" address relative to application traffic management device 130. See FIG. 1. For a TCP/IP packet, packet processor 92 can compute the inside and outside addresses based on the source and destination network addresses of the packet and the direction of the packet flow. Still further, packet processor 92 can also identify which host is the client and which host is the server for a given data flow and store this information in the flow specification or control block object. The identification of a server or client in a given transaction generally depends on the network protocols employed by the hosts. For example, in TCP flows, a client initiates a transaction by transmitting a SYN packet to initiate a TCP connection. Application traffic management device 130 can detect the SYN packet and note the source network address of the packet as the client host, and the destination address as the server host. One of ordinary skill in the art will recognize how to identify clients and servers in connection with other networking protocols.

In one embodiment, packet processor 92 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 92 hashes the values identified above and scans the hash table for a matching entry. If one exists, packet processor 92 associates the pointer to the corresponding control block object with the packets in the data flow.

Packet processor 92, in one implementation, maintains certain data in host database 134 that support the classification of data flows based on behavioral attributes of the end systems associated with the flows. U.S. application Ser. No. 10/938,435 describes some of the data flow metrics that can be maintained in host database 134, according to an embodiment of the present invention. For example, packet processor 92, in one embodiment, maintains, inter alia, for each IP address 1) the number of concurrent connections (Conn); 2) the current data flow rate (Curr rate); and 3) the average bits per second (bps) over a one minute interval (1 Min avg). In addition, in one implementation, host database 134 maintains for each host address the following fields: 4) the number of new flows or connections for which the host is a client over the last minute; 5) the number of new flows or connections for which the host is a server over the last minute; and 6) the number of failed flows corresponding to a given host. In some implementations, host database 134 may also be configured to maintain: 7) the number of current or existing TCP (or other handshake-oriented protocol) connections for which the host is a client; 8) the number of current UDP (or other similar protocol) connections for which the host is a client; 9) the number of current or existing TCP (or other handshake-oriented protocol) connections for which the host is a server; and 10) the number of current UDP (or other similar protocol) connections for which the host is a server. As discussed above, packet processor 92 is operative to identify new data flows, as well as the termination of existing data flows, and updates the statistics identified above as data flows traverse network device. As discussed below, traffic classification engine 96, in one implementation, is operative to access these values, as well as other data structures (e.g., flow database 135) to classify a data flow. In one embodiment, a process executing in the packet processing path, for example, can collect the raw data at periodic intervals for subsequent evaluation by other processes or modules, such as traffic classification engine 96.

In addition, administrator interface 150 may also access the host database and display its current state to a network administrator. In one implementation, administrator interface 150 allows various views of the information in host database 134 sorted (in ascending or descending order) based on one of the selected data fields of the database. Administrator interface 150, in one implementation, is also operative to facilitate configuration of a traffic class based on one or more attributes maintained by the host database 134. For example, administrator interface 150 may allow a user to select one or more entries (as well as one or more data fields) in host database 134 and use the values corresponding to the selected entries and data fields to configure a traffic class. For example, administrator interface 150 can compute the minimum values for each data field across the selected entries and use them as the basis for matching attributes in a traffic class.

A.2. Traffic Classification Engine

Traffic classification engine 96 is operative to inspect packets in data flows, and apply matching rules corresponding to a plurality of traffic classes. Traffic classification engine 96, in one implementation, comprises a plurality of service type identification modules, each of which correspond to a set of service types. Each service type identification module analyzes one or more packets in a given data flow to attempt to identify a service type corresponding to the flow. A service type, in one implementation, can be a network protocol, a service, or a network-application. For example, one service type identification module can correspond to a network application, such as Citrix®, while another service type identification module can be dedicated to detecting Oracle® or PostgreSQL database traffic. Still other service type identification modules can classify HTTP flows, FTP flows, ICMP flows, RTP flows, NNTP, SMTP, SSL, DICOM and the like. In one implementation, traffic classification engine 96 passes pointers to received packets to each service type identification module, which then inspect the packets stored in the buffer memory. In one implementation, each service type identification module has an associated packet count threshold (in the aggregate, packets from server to client, or client to server) after which it no longer attempts to classify a data flow. In one implementation, the packet count threshold wilt vary across the service type identification modules. For example, a service type identification module dedicated to classifying Citrix® traffic may be able to classify a data flow with certainty after three packets. In many instances, application traffic management device 130 may have to encounter more than one packet corresponding to a data flow in order to finally classify the data flow. For example, the initial TCP handshake packets may only reveal IP address, port numbers and protocol identifiers. While this information may be sufficient to identify HTTP traffic, for example, additional packets (such as data packets) may reveal a more specific network application, such as an accounting application or peer-to-peer file sharing application, that utilizes HTTP. Accordingly, in one implementation, each service type identification module responds to receiving a pointer to a packet by 1) reporting a matching service type identifier and the desire to inspect more packets in the flow (to possibly identify a more specific service type identifier); 2) reporting a matching service type and no interest in inspecting subsequent packets in the flow; 3) reporting no matching service type identifier and the desire to inspect more packets in the flow; and 4) reporting no matching service type and no interest in inspecting subsequent packets in the flow.

To allow for identification of service types (e.g., FTP, HTTP, etc.), traffic classification engine 96, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and a 5) default bandwidth management policy. A service aggregate encompasses a combination of individual services (each including different matching criteria, such as different port numbers, etc.) corresponding to the service aggregate. When application traffic management device 130 encounters a new flow, the service type identification modules of traffic classification engine 96 analyze the data flow against the service attributes in their respective services tables to identify a service ID corresponding to the flow. In one embodiment, traffic classification engine 96 may identify more than one service ID associated with the flow. In this instance, traffic classification engine 96 associates the more/most specific service ID to the flow. For example, network traffic associated with a peer-to-peer file sharing service may be identified according to a network protocol, such as TCP or HTTP traffic, as well as higher level, application-specific traffic types such as the actual file sharing application itself (e.g., Napster, Morpheus, etc.). In this instance, traffic classification engine 96 associates the flow with the most specific service ID. As a further example, an RTSP application data flow can be further classified to RTSP-Broadcast or RTSP-REALNET-TCP in the middle of the flow after a particular signature in the packets is encountered. In one implementation, traffic classification engine 96 writes the identified service type ID into the control block (flow) object corresponding to the data flow.

As discussed more fully below, service type identification, in one implementation, is a preliminary operation to the classification of a data flow according to the hierarchical traffic classification scheme configured by a network administrator. For example, a traffic class maintained by traffic classification engine 96 may be configured to include matching rules based on the service IDs in the services table. For example, a matching rule directed to HTTP traffic may simply refer to the corresponding service ID, as opposed to the individual attributes that the service type identification modules uses to initially identify the service. This implementation allows for a variety of hierarchical traffic classification configurations, such as the configuration of child traffic classes that further classify HTTP traffic on the basis of a network application, a range of IP addresses, and the like.

Still further, the service type identifiers can correspond to a specific network application (e.g., Napster, Citrix, NetIQ, Oracle, Skype, etc.) and more generally to network protocols or services, such as IP, TCP, HTTP, SOAP, XML, UDP, FTP, SMTP, FTP, UDP, etc. As discussed more fully below, in one implementation, traffic classification engine 96 triggers operation of host probing module 97 for a given data flow, if a service type identifier corresponding to a network application (as opposed to a protocol or service) is not identified within a threshold number of packets.

A traffic class comprises a set of matching rules or attributes allowing for logical grouping of data flows that share the same characteristic or set of characteristics. In one implementation, the matching rules can correspond to the service type identifiers discussed above, as well as other data flow attributes, such as the network interface on which the packets are received by application traffic management device, whether the server is the inside or outside host (see above), non-standard and standard port numbers, host IP address or subnet, MAC address, application-specific strings, diffserv codes, MPLS tags, VLAN tags, and the like. In one embodiment, each traffic class has at least one attribute defining the criterion(ia) used for identifying a specific traffic class. In one implementation, the attributes defining a given traffic class can be based on explicitly presented attributes of one or more packets corresponding to a data flow (as discussed above), or be based on behavioral attributes of the end systems associated with the flow. The U.S. patent applications identified above disclose various network traffic classification mechanisms that can be incorporated into embodiments of the present invention. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, application traffic management device 130 includes functionality allowing for classification of network traffic based on information from layers 2 to 7 of the OSI reference model. Application traffic management device 130 can be configured to include matching rules that define a plurality of network applications commonly found in enterprise networks, such as database applications, Citrix® flows, ERP applications, and the like. As discussed below, the matching rules or attributes for a traffic class may be based on various types of node behavior, such as the number of concurrent connections of the inside or outside host.

In one embodiment, application traffic management device 130 is configured to include a predefined set of traffic classes based upon a knowledge base gleaned from observation of common or known traffic types on current networks. Application traffic management device 130, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 96 also stores traffic classes added by the traffic discovery module. Furthermore, as discussed below, application traffic management device 130 may also include traffic class discovery functionality that automatically adds traffic classes to traffic classification engine 96 in response to data flows traversing the device. Automatic network traffic discovery and classification (see below) is disclosed in U.S. Pat. Nos. 6,412,000, 6,457,051, and 6,591,299, which are incorporated herein by reference.

Traffic classification engine 96, in one implementation, stores traffic classes associated with data flows that traverse access link 21. Traffic classification engine 96, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. U.S. application Ser. No. 10/334,467, as well as other patents and patent applications identified above, disclose how traffic classification engine 96 traverses the hierarchical tree to match a data flow to a leaf traffic class node.

In one embodiment, the root traffic classifications are "/Inbound" and "/Outbound" data flows. Any data flow not explicitly classified is classified as "/Inbound/Default" or "/Outbound/Default". The "LocalHost" traffic class corresponds to packets and data flows destined for application traffic management device 130, such as requests for stored measurement data, traffic class mapping packets, or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree.

In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Application traffic management device 130 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 96 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

A.2.a. Automatic Traffic Classification

In one implementation, network device application processor 75 further includes a traffic discovery module (not shown) that analyzes data flows for which no matching traffic class was found in traffic classification engine 96. The traffic discovery module, in one embodiment, is operative to apply predefined sets of matching rules to identify a traffic class corresponding to non-matching data flows. In one implementation, the traffic discovery module operates on data flows classified as either /Inbound/Default or Outbound/Default. In one embodiment, the traffic discovery module is configured to include a predefined set of traffic classes based upon a knowledge base gleaned from observation of common or known traffic types on current networks. As with the classification of data flows against the traffic class configuration hierarchy, automatic traffic discovery can be based, at least in part, on the service type identifiers determined by traffic classification engine 96 (see above). In one embodiment, the traffic discovery module creates traffic classes automatically in response to data flows traversing bandwidth management device 130 and stores such traffic classes in traffic classification engine 96. Automatic traffic classification is disclosed in U.S. Pat. Nos. 6,412,000, 6,457,051, and 6,591,299, which are incorporated herein by reference.

As discussed above, the traffic discovery module applies one or more traffic discovery thresholds when deciding whether to present or add newly discovered traffic classes. In one embodiment, the traffic discovery module must detect a minimum number of data flows within a predefined period for a given traffic type before it creates a traffic class in traffic classification engine 96. In one embodiment, such discovered traffic classes are, by default, attached to or associated with either the "/Inbound/Autodiscovered/" or "/Outbound/Autodiscovered/" bandwidth control category, as appropriate. As discussed below, administrator interface 150 allows for configuration of bandwidth controls for auto-discovered traffic classes. In one embodiment, auto-discovered traffic classes are automatically assigned predefined bandwidth utilization controls. U.S. patent application Ser. No. 09/198,051, incorporated by reference herein, discloses automatic assignment of bandwidth utilization controls for discovered traffic classes. Furthermore, as discussed above, the traffic discovery module is operative to dynamically adjust one or more traffic discovery thresholds depending on at least one observed parameter or attribute, such as the rate of discovering new traffic classes relative to the number of data flows.

In one implementation, the traffic discovery module automatically adds newly discovered traffic classes to traffic classification engine 96, which are presented to the network administrator with manually configured and/or previously discovered traffic classes. In an alternative embodiment, the traffic discovery module may save the newly discovered traffic classes in a separate data structure and display them separately to a network administrator. The list may be sorted by any well-known criteria such as: 1) most "hits" during a recent interval, 2) most recently-seen (most recent time first), 3) most data transferred (bytes/second) during some interval, or a moving average. The user may choose an interval length or display cutoff point (how many items, how recent, at least B bytes per second, or other thresholds). The network manager may then take some action (e.g. pushing a button) to select the traffic types she wishes to add to the classification tree.

A.2.b. Orthogonal Attribute Classification

As discussed in U.S. application Ser. No. 10/938,435, traffic classification engine 96, in one implementation, supports matching rule predicates that correspond to various conditions, such as node behavior and path metrics, which are orthogonal to explicit packet attributes. In some implementations, this allows for a bandwidth management scheme that can classify data flows relative to the observed behavior of either one of, or both, the end systems or nodes associated with a data flow and can apply appropriate policies to the flows. In one implementation, the matching rule predicates for node behavior are based on statistics maintained by host database 134 (see above), such as the numbers of currently active flows (in the aggregate or with respect to a certain protocol, such as TCP or UDP) and rate of new flows. In other implementations, additional or alternative matching rule predicates can be created based on network path metrics, such as observed round-trip time, packet exchange time, normalized network delay, server delay, total delay, and/or current transmission rate (bps). U.S. application Ser. No. 10/812,198 discloses the computation of how these metrics can be computed. Computation of packet exchange time is disclosed in U.S. application Ser. No. 09/710,442. Other characteristics orthogonal to packet attributes that one could use to classify traffic are current CPU utilization or the inbound or outbound link utilizations. For example, data flows can be classified based on the CPU utilization or load placed on application traffic management device 130, access link 21 and/or even router 22 (by polling its interface via SNMP, for example), as opposed to the behavior of the corresponding end systems or explicit packet attributes of a given flow. In one implementation, the matching rules, traffic classes, and policies can be created once and continue to carry out their objectives without any reconfiguration of traffic classification engine 96. Still further, these orthogonally-based predicates may be combined with matching rules that operate on attributes of the packets themselves (see above) to achieve a variety of objectives.

The following provides matching rule predicates, according to one implementation of the invention, that can be used in connection with configuration commands entered in a command line or web-based interface:

1) client-flow-rate:<low>-<high>: This command specifies a range for the number of new flows or connections for which the host is a client over the last minute. This predicate can be applied to inside and/or outside hosts relative to application traffic management device 130 (see Section A.1., above). The rates are specified in flows-per-minute (FPM) or you may use "unlimited" for the <high> value.
2) server-flow-rate:<low>-<high>: This command specifies a range for the number of new flows or connections for which the host is a server over the last minute. This predicate can be applied to inside and/or outside hosts
3) failed-flow-rate:<low>-<high>: This command specifies a range for the number of failed flows or connections for which a host is a client. For TCP flows, a failed flow can be detected when a RST packet is transmitted in response to a SYN packet, or when no response to a SYN packet is received after a threshold period of time.
4) tcp-flows:<low>-<high>: This command specifies a range of the number of current TCP flows for a host.
5) udp-flows:<low>-<high>: This command specifies a range of the number of current UDP flows for a host.

A.2.c. Host Probing Module

FIG. 4 illustrates the coordinated operation of the service type identification modules (discussed above) of traffic classification engine 96 and host probing module 97. In one implementation, packet processor 92, after it has processed a packet, passes a pointer to the packet in the buffer, which the traffic classification engine 96 receives (142). In the implementation shown, if the host probing flag has not been set (144), traffic classification engine 96 passes the packet to one or more service type identification modules (146). As discussed above, each service type identification module analyzes the packet, and possibly data fields in the flow object, to identify a service type for the flow. As discussed above, each service type identification module limits its analysis to the first P packets in a flow (in the aggregate, in the server-to-client direction, or the client-to-server direction) before either identifying a service type or reporting that no service type was identified. In one implementation, the threshold packet count, P, may vary across the service type identification modules. As FIG. 4 illustrates, if none of the service type identification modules identifies a network-application-level service type (such as, Cytrix, Oracle, Napster, etc.) (148) after alt have completed inspection of the packets in a given data flow (150), traffic classification engine 96 sets the host probing flag in the flow object corresponding to the data flow (152). Traffic classification engine 96 then processes the packet against the hierarchical traffic class configuration to classify the data flow (156). As FIG. 4 illustrates, when the host probing flag is set (144), the packet and flow object pointers are passed to host probing module 97, which probes an end-host associated with the flow to potentially identify a traffic class (see below).

FIG. 5 illustrates the process flow, according to one implementation of the present invention, directed to probing a host according to one or more available host patterns in order to identify a network application. In one implementation, host probing module 97, when invoked as to a given data flow, operates in a separate process from packet processor 92, traffic classification engine 96 and flow control module 94 to ensure that packet through-put is not substantially affected. As FIG. 5 illustrates, when host probing module 97 receives a pointer to a packet in a data flow (162), it inspects the packet and flow object attributes to identify the host(s) to be probed and, in some implementations, the location of the client and/or server relative to application traffic management device 130 (164). This may be useful to determine the availability of any host probe patterns that can be used to potentially classify the data flow (166). For example, one or more host probe patterns may be limited to clients located to the "inside" of application traffic management device 130 (in other words, to clients connected to network 40 in the implementation illustrated in FIGS. 1 and 2). Host probing module 97 may also eliminate certain host probe patterns from consideration for a given data flow based on other flow attributes, such as source and/or destination port numbers, protocol identifiers, and the like. In one implementation, host probing module 97 then determines whether host probing has already started or completed for the flow (165). In addition, if there are no available host probe patterns, host probing module 97 returns a "no service id found" message to traffic classification engine (184). Otherwise, host probing module 97 selects the first available host probing pattern (168), and composes and transmits a probe packet to an end host according to the first probe pattern (170). If a response is received (172) before it times out (174), host probing module 97 compares the response to the probe pattern. If a match is found, host probing module 97 returns a service type identifier corresponding to the identified network application (178). Otherwise, host probing module 97 repeats the probing process for all remaining available host probe patterns, if any (180, 182).

Other implementations are possible. As FIG. 4A illustrates, traffic classification engine 96, in one implementation, can invoke host probing module for each new data flow (192). In such an implementation, host probing module 97 operates concurrently with the service type identification modules discussed above. As FIG. 4A also illustrates, in one implementation, once an application-level service type is identified all other service type identification processes are stopped for the same data flow. For example, the processes implemented by host probing module 97 are stopped, if a service type identification module identifies an application-level service type, and vice versa.

Probing hosts against one or more network application profiles is useful to classify network traffic in many instances where explicitly presented attributes of the packets are obscured or insufficient to identify a network application, such as, but not limited to, 1) the case where the network traffic is encrypted, 2) where the network application does not have a known or sufficiently-unique application signature revealed in the packets, 3) where the packets are transmitted from a proprietary application where the header format is unknown, and 4) a large amount of memory would be otherwise required to store information from previous packets in a given flow for subsequent classification.

A.2.c.1. Probe Packets  Host Probe Patterns

A host probe pattern can include a variety of information detailing how a host is probed to identify a given network application. A host probe pattern, in one implementation, can specify the parameters by which host probing module 97 emulates a peer in a peer-to-peer network application. In another implementation, a host probe pattern can specify how to emulate a client in a traditional server-client network application. In yet another implementation, a host probe pattern can specify how to emulate a server in a server-client network application. A host probe pattern, for example, may specify connection parameters, such as the transport layer connection to be used, whether encryption and/or tunneling is used, etc. In addition, the host probe pattern may also specify the configuration of one or more probe packets, as well as the configuration of an expected response. Probe packets can be sent to either source or destination host of the flow or both. In one implementation, the IP address and port numbers corresponding to one of the end hosts involved in the flow are used for the destination fields of the probe packet, while an IP address and a port number of application traffic management device 130 from a range of port numbers dedicated to host probing are used in the source fields. To transmit the probe packet, host probing module 97, in one implementation, creates a socket and then writes the probe packet to the socket, which waits for a response. In one implementation, host probing module 97 can select choose the same transport protocol (e.g., TCP, UDP) as that seen in the flow, or a different transport protocol based on any relevant information in the packet or control block object.

The data payload of the probe packet may contain user-specified, fixed data, or can be dynamically generated by using a predetermined algorithm. In one implementation, the data inserted in the payload, whether statically or dynamically defined, is based on a heuristic evaluation and analysis of actual or simulated sessions between end hosts employing the particular network application corresponding to the host probe pattern. In one implementation, the data payload is a copy of a payload from a packet captured in a previous active or simulated session. After constructing the IP and TCP/UDP headers and application data for the probe packet, host probing module 97 computes the IP and protocol checksums for the probe packet.

After host probing module 97 creates a probe packet, in one implementation, it initiates a connection to the target end host. For example, host probing module 97 can attempt to initiate a TCP connection or an encryption handshake with the network application on the target end host. After establishing a successful connection, host probing module 97 then transmits the probe packet to the target end host. Of course, if the UDP transport protocol is used, connection setup is not required. In one implementation, host probing module 97 maintains state information for each probe packet in order to identify responses, if any, transmitted by the target end host. In addition, as discussed above, host probing module 97 may probe both end hosts associated with a given data flow and examine the responses, if any, in an attempt to identify the network application corresponding to the data flow.

A.2.c.2. Responses to Probe Packets

Probe responses, if any, will be generated by the application residing on the target end host and transmitted back to application traffic management device 130. Using the state information maintained in connection with the probe packets, host probing module 97 matches the probe response to the transmitted probe packet and compares the response with one or more expected response signatures identified in the host probe pattern. The expected response signatures can be static or dynamically generated based on a response template corresponding to the host probe pattern. If the response matches a response signature, host probing module 97 returns the service type identifier corresponding to the identified network application. Otherwise, host probing module 97, in one implementation, repeats the process for any remaining available host probe patterns. In one implementation, host probing module 97 can use information gleaned from a previous, unsuccessful probe sequence to eliminate one or more of the remaining host probe patterns from application to a given data flow.

As discussed above, the network application of the target host may respond to probe packets in different manners depending on the state of the network application, executed on a target end host, at any given instance. To address these circumstances, the host probe pattern corresponding to the network application may include multiple response signatures or profiles, some of which may be statically defined, while others are dynamically defined. FIGS. 6A thru 6D illustrate examples of probe packets and probe responses according to one implementation of the present invention. FIG. 6A illustrates attributes of a probe packet designed to detect whether an end host is running a peer-to-peer, VOIP application. As FIG. 6A illustrates, host probing module 97 uses the IP address and port number of the target end host, as detected in the packets traversing application traffic management device 130, as the destination address 202 and port number 204, respectively. FIG. 6B illustrates the attributes of a probe response that could be expected from a Skype peer. Still further, FIG. 6C illustrates the attributes of a probe packet transmitted to a second host, using a different IP address-port number pair. FIG. 6D illustrates the attributes of a response to the probe packet from a Skype peer. Note that, in both cases, the first two bytes 206 of the payload of the probe packet are copied into the first two bytes of the response packet payloads. In addition, note that the third byte in the response payload changes from a 0x02 to 0x07 between the probe packet and the response. Note, however, that the response transmitted by the second host (FIG. 6D) also includes the IP address 209 (see FIG. 6C) of the application traffic management device 130 that transmitted the probe packet in the payload of the response (see FIG. 6D, 208). From an evaluation of these probe responses, two response profiles or signatures can be developed. According to a first response profile, a probe response can be validated based on the first two data bytes 206 in the payload. According to a second response profile, a probe response can be validated based on the appearance of the IP address 208 in the payload after the third byte. Of course, other attributes can also be used as well. One of skill in the art will recognize how to develop response profiles or signatures by probing a variety of hosts implementing a given network application, recording responses, and analyzing the responses for unique attributes or behaviors to develop a response signature or profile for use in connection with the present invention.

A.2.c.3. Configuration Parameters and Additional Options

Host probing module 97 can feature a variety of configurable parameters. For example, using administrator interface 150, a user can specify, for example, 1) when host probing should be initiated, 2) the number of probe packets to send according to a given host probe pattern before declaring no match, 3) how long to wait for a probe response before sending the next probe packet, 4) a list of hosts (by IP address) that should be excluded from probing, and 5) a list of hosts (by IP address, subnet or interface) where probing is preferred. One skilled in the art will recognize that a variety of configuration options are possible and that the foregoing is merely illustrative.

In some implementation, host probing module 97 can use the information obtained from probing one target end host to aid in the classification of data flows from other end hosts, or subsequent data flows associated with the same host. For example, host probing module 97 can be configured to save an IP address and port number pair in association with an identified service type. If a subsequent flow, having the same IP address and port number pair is encountered, host probing module 97 returns the associated service type in lieu of performing an additional probe. In one implementation, host probing module 97 can re-initiate a probe of the host based on the staleness of this information.

In addition, host probing module 97 can be configured to prioritize the selection of a given target host based on observed behaviors, such as the number of current connections, rate of new connections, etc. For example, a large number of current connections may indicate the possibility of a super-host in a peer-to-peer application. In some instances, probing a super-host may be more informative than probing a host having less activity associated with it.

A.3. Flow Control Module

As discussed above, flow control module 94 applies bandwidth utilization controls (and, in some embodiments, other policies) to data flows traversing access link 21. The above-identified patents and patent applications describe the operation of, and bandwidth utilization controls, implemented or supported by flow control module 94. Application traffic management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention. The functionality of flow control module 94, in one implementation, can be conceptually segregated into three main tasks: 1) allocation of bandwidth to individual flows, 2) enforcement of bandwidth allocations, and 3) monitoring of actual bandwidth utilization to provide feedback to subsequent bandwidth allocations.

Allocation of bandwidth is primarily influenced by three main factors: 1) the number of concurrent flows and their respective traffic classifications; 2) the overall or aggregate bandwidth utilization control scheme configured by the network administrator (such as the capacity of the access link, the partitions that have been configured, configured rate policies, and the like), and 3) the respective target rates corresponding to the individual flows. U.S. application Ser. No. 10/810,785 and U.S. Pat. Nos. 5,802,106 and 6,205,120, incorporated by reference above, disclose methods for determining target rates for data flows for use in bandwidth allocation decisions. As discussed above, a user can select a given traffic class and specify one or more bandwidth utilization controls for the traffic class. A bandwidth utilization control for a particular traffic class can comprise an aggregate bandwidth utilization control, a per-flow bandwidth utilization control, or a combination of the two (see Sections A.3.a. it A.3.b.). The combination of bandwidth utilization controls across the traffic classes defines an aggregate bandwidth utilization control scheme.

Flow control module 132 can use any suitable functionality to enforce bandwidth allocations known in the art, including, but not limited to class-based queuing, weighted fair queuing, class-based weighted fair queuing, Committed Access Rate (CAR) and "leaky bucket" techniques. Flow control module 132, in one implementation, may incorporate any or a subset of the TCP rate control functionality described in the cross-referenced U.S. patents and/or patent applications set forth above for controlling the rate of data flows.

A.3.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solutions for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts. For example, a network administrator may configure a partition for data flows associated with suspicious users to limit the effect of the network traffic associated with them on utilization of access link 21.

A.3.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994, now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

A.4. Overall Process Flow

FIG. 3 illustrates the overall process flow, according to one implementation of the present invention, directed to the operation of application traffic management devices 130. In one embodiment, packet processor 92 receives a data packet (FIG. 3, 102) and determines whether the packet is a response to a probe packet transmitted by host probing module 97 (110). If so, packet processor 92 passes a pointer to the packet in the buffer to host probing module 97. Otherwise, packet processor 92 determines whether flow database 135 contains an existing control block object corresponding to the data flow (104) (see Section A.1., supra). If no control block object corresponds to the data packet, packet processor 92 constructs a control block object including attributes characterizing the data flow, such as source address, destination address, etc. (106) (see above). In one embodiment, packet processor 92 analyzes the source and destination IP addresses in the packet header and scans host database 134 for matching entries. If no matching entries exist, packet processor 92 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, protocol type, pointers to variable-length information in a dynamic memory pool, and other parameters characterizing the data flow.

As FIG. 3 illustrates, packet processor 92 updates, for existing data flows, attributes of the flow object in response to the packet such as the packet count, last packet time, and the like. Packet processor 92 can also perform other operations, such as analyzing the packets for connection state information. For example, packet processor 92 can inspect various TCP flags to determine whether the received packet is part of a new data flow or represents a change to an existing data flow (such as the first data packet after the TCP handshake). Methods for determining new data flows and assigning packets to existing data flows are well known in the art and also depend on the particular transport layer protocol employed. For a TCP packet, packet processor 92 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another embodiment, a separate process monitors the last packet times associated with UDP, GRE and similar flow types to detect termination of a given flow.

As FIG. 3 illustrates, packet processor 92 then passes a pointer to the packet, in one implementation, to traffic classification engine 96, which operates as discussed above to classify the data flow. As FIG. 3 illustrates, application traffic management device 130 may also perform other operations in response to arrival of the packet. For example, measurement engine 140 may record certain measurement variables on an aggregate or per-traffic class basis (116). Lastly, the packet is passed to flow control module 134 (118), which performs flow control operations on the data packets.

Lastly, although the present invention has been described as operating in connection with end systems and networks employing the TCP, IP and Ethernet protocols, the present invention has application in computer network environments employing any suitable transport layer, network layer and link layer protocols. Moreover, other system architectures are possible. For example, the host probing functionality described above can be implemented on a separate network device. Still further, the host probing functionality discussed above can be implemented as scripts executed by an embedded runtime environment. U.S. application Ser. Nos. 10/178,617 and 10/812,198 discloses the use of embedded runtime environments and scripts in application traffic management devices. Accordingly, the present invention has been described with reference to specific embodiments. Other embodiments of the present invention wilt be apparent to one of ordinary skill in the art. It is, therefore, intended that the claims set forth below not be limited to the embodiments described above.

What is claimed is:

1. An apparatus facilitating network traffic classification, comprising:
 a memory for buffering packets corresponding to data flows traversing a network path;
 a packet processor operative to
  associate the buffered packets with corresponding data flows;

parse explicit attributes of at least one packet associated with the data flows into corresponding flow objects;

a traffic classification engine operative to
compare the flow objects to a plurality of traffic types, and
if the comparison finds a matching traffic type in the plurality of traffic types, associate the data flow with the matching traffic type; and a host probing module operative, as to a selected data flow between a first host and a second host, to
generate and transmit a probe packet to the first host;
receive a response to the probe packet;
compare the response to a profile corresponding to a network application; and
associate the data flow with an identifier corresponding to the network application, if the response matches the profile.

2. The apparatus of claim 1 wherein the host probing module operates in connection with a plurality of profiles each corresponding to a respective network application; and wherein the host probing module is operative to select a profile from the plurality of profiles based on attributes of at least one packet in the selected data flow.

3. The apparatus of claim 2 wherein each profile defines attributes of a probe packet and attributes of an expected response to the probe packet.

4. The apparatus of claim 2 wherein at least one profile in the plurality of profiles defines parameters by which the host probing module emulates a peer in a peer-to-peer network application.

5. The apparatus of claim 2 wherein at least one profile in the plurality of profiles defines parameters by which the host probing module emulates a client in a server-client network application.

6. The apparatus of claim 2 wherein at least one profile in the plurality of profiles defines parameters by which the host probing module emulates a server in a server-client network application.

7. The apparatus of claim 1 wherein the traffic classification engine is operative to classify the data flows based on attributes of the packets in the data flows.

8. The apparatus of claim 7 wherein the host probing module is operative to abort classification of the data flow if the traffic classification engine identifies the data flow as matching a network application.

9. The apparatus of claim 8 wherein the traffic classification engine is operative to abort classification of the data flow if the host probing module identifies the data flow as matching a network application.

10. A method for classifying network traffic, comprising:
detecting a data flow comprising at least one packet transmitted between a first host and a second host;
classifying, based on attributes of the at least one packet, the data flow into a traffic class selected from a plurality of traffic classes;
if, after encountering a threshold number of packets in the data flow, the traffic class identified in the classifying step does not correspond to a network application, then generating and transmitting a probe packet to the first host;
receiving a response to the probe packet;
comparing the response to a profile corresponding to a network application; and
associating the data flow with a traffic class corresponding to the network application, if the response matches the profile.

11. The method of claim 10 further comprising selecting the profile from a plurality of profiles based on attributes of at least one packet in the selected data flow, wherein each profile in the plurality of profiles corresponds to a respective network application.

12. The method of claim 11 wherein each profile defines attributes of the probe packet and attributes of an expected response to the probe packet.

13. The method of claim 12 wherein at least one profile in the plurality of profiles defines parameters by which the host probing module emulates a peer in a peer-to-peer network application.

14. The method of claim 12 wherein at least one profile in the plurality of profiles defines parameters by which the host probing module emulates a client in a server-client network application.

15. The method of claim 12 wherein at least one profile in the plurality of profiles defines parameters by which the host probing module emulates a server in a server-client network application.

16. A method for classifying network traffic, comprising:
detecting a data flow comprising at least one packet transmitted between a first host and a second host;
classifying, based on attributes of at least one packet of the data flow, the data flow into a traffic class selected from a plurality of traffic classes;
selecting a profile from a plurality of profiles based on attributes of at least one packet the data flow, wherein each profile in the plurality of profiles corresponds to a respective network application;
generating and transmitting a probe packet according to the selected profile to the first host;
receiving a response to the probe packet;
comparing the response to the selected profile; and
associating the data flow with an identifier corresponding to the network application associated with the selected profile, if the response matches the selected profile;
stopping the classifying step if a network application is associated with the flow; and
aborting the receiving, comparing and associating steps if the classifying step yields a traffic class corresponding to a network application.

17. An apparatus facilitating network traffic classification, comprising:
a memory for buffering packets corresponding to data flows traversing a network path;
a packet processor operative to
associate the buffered packets with corresponding data flows;
a host probing module operative, as to a selected data flow between a first host and a second host, and in connection with a plurality of profiles each corresponding to a respective network application, to
select a profile from the plurality of profiles based on attributes of at least one packet in the selected data flow, wherein each profile defines attributes of a probe packet and attributes of an expected response to the probe packet;
generate and transmit a probe packet to the first host;
receive a response to the probe packet;
compare the response to the selected profile corresponding to a network application; and
associate the data flow with an identifier corresponding to the network application, if the response matches the selected profile.

18. The apparatus of claim 17 wherein at least one profile in the plurality of profiles defines parameters by which the host probing module emulates a peer in a peer-to-peer network application.

19. The apparatus of claim 17 wherein at least one profile in the plurality of profiles defines parameters by which the host probing module emulates a client in a server-client network application.

20. The apparatus of claim 17 wherein at least one profile in the plurality of profiles defines parameters by which the host probing module emulates a server in a server-client network application.

21. The apparatus of claim 17 further comprising a traffic classification engine operative to classify the data flows based on attributes of the packets in the data flows.

22. The apparatus of claim 21 wherein the host probing module is operative to abort classification of the data flow if the traffic classification engine identifies the data flow as matching a network application.

23. The apparatus of claim 22 wherein the traffic classification engine is operative to abort classification of the data flow if the host probing module identifies the data flow as matching a network application.

* * * * *